(12) United States Patent
Liu

(10) Patent No.: US 9,030,918 B2
(45) Date of Patent: May 12, 2015

(54) METHOD FOR MOBILE UNDERWATER ACOUSTIC COMMUNICATIONS

(71) Applicant: Zhiqiang Liu, Henrico, VA (US)

(72) Inventor: Zhiqiang Liu, Henrico, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 4 days.

(21) Appl. No.: 13/795,971

(22) Filed: Mar. 12, 2013

(65) Prior Publication Data

US 2014/0269201 A1 Sep. 18, 2014

(51) Int. Cl.
*H04B 13/02* (2006.01)
*H04B 11/00* (2006.01)

(52) U.S. Cl.
CPC ............... *H04B 13/02* (2013.01); *H04B 11/00* (2013.01)

(58) Field of Classification Search
CPC ....................................................... H04B 13/02
USPC ........................................................ 367/134
See application file for complete search history.

(56) References Cited

U.S. PATENT DOCUMENTS 4,481,640 A * 11/1984 Chow et al. ................... 375/143
6,130,859 A * 10/2000 Sonnenschein et al. ...... 367/134

OTHER PUBLICATIONS

M. K. Simon and D. Divsalar, "On the implementation and performance of single and double differential detection schemes," IEEE Trans. Commun., vol. 40, No. 2, pp. 278-291 (Feb. 1992).
E. M. Sozer, J. G. Proakis, M. Stojanovic, J. A. Rice, A. Benson and M. Hatch, "Direct sequence spread spectrum based modem for under water acoustic communication and channel measurements," Oceans '99 MTS/IEEE Riding the Crest into the 21st Century, vol. 1, No., pp. 228,233 vol. 1 (1999).

* cited by examiner

*Primary Examiner* — Daniel Pihulic
(74) *Attorney, Agent, or Firm* — US Naval Research Laboratory; L. George Legg

(57) ABSTRACT

A method for mobile underwater acoustic communications includes double differentially (DD) encoding a communication signal to produce a DD-encoded communication signal, applying direct sequence spread spectrum (SS) to the DD-encoded signal to produce a DD-SS communication output signal, and transmitting the DD-SS communication output signal. The method i) increases the SNR via processing gain, ii) eliminates the ISI through multipath suppression, and iii) enables bandwidth efficiency improvement via data multiplexing. The method is shown capable of facilitating simple receiver processing and offering performance robustness against unpredictable channel fluctuations.

6 Claims, 7 Drawing Sheets

METHOD FOR MOBILE UNDERWATER ACOUSTIC COMMUNICATIONS

FIELD OF THE INVENTION

The invention is directed to underwater acoustic communications, and more particularly to a double differentially coded spread spectrum (DD-SS) method for underwater acoustic communications.

BACKGROUND OF THE INVENTION

Reliable long-range acoustic communications (LRAC) is an enabling technology for numerous applications of manned and unmanned underwater systems. For example, with the capability of communicating at long ranges of several hundreds or even thousands kilometers, it will become possible to remotely command and control unmanned underwater vehicles that are otherwise unreachable. As another example, underwater systems will be able to rely on such capability to establish a wide-area undersea network to complete missions in a collaborative fashion. As an active area of research, LRAC has received a tremendous amount of attention for the past two decades. A number of LRAC schemes have been proposed and tested by sea-going experiments. However, most research and experiments done so far have concentrated on the fixed LRAC cases where both the source and the receiver are moored (see e.g., M. Stojanovic, J. A. Catipovic, and J. G. Proakis, "Adaptive multichannel combining and equalization for underwater acoustic communications," Journal of the Acoustical Society of America, vol. 94, no. 3, pp. 1621-1631, 2000; V. Capellano, "Performance improvements of a 50 km acoustic transmission through adaptive equalization and spatial diversity," in OCEANS, October 1997, pp. 569-573; L. Freitag and M. Stojanovic, "Basin-scale acoustic communication: A feasibility study using tomography m-sequences," in OCEANS, 2001. MTS/IEEE Conference and Exhibition, vol. 4. IEEE, 2001, pp. 2256-2261; A. Plaisant, "Long range acoustic communications," in OCEANS, October 1998, pp. 569-573; and H. Song, W. Kuperman, and W. Hodgkiss, "Basin-scale time reversal communications," The Journal of the Acoustical Society of America, vol. 125, p. 212, 2009).

In mobile LRAC applications the source and/or the receiver move at a significant speed. LRAC is made difficult by a number of factors, including (but not limited to) low signal-to-noise ratios (SNRs) mainly caused by large transmission losses, significant Doppler shifts induced by relative source-receiver motion as well as environmental factors such as internal waves, and severe inter-symbol interference (ISI) due to large channel delay spread. While these performance-limiting factors exist in both fixed and mobile LRAC, they tend to be more pronounced and therefore more difficult to be dealt with in the mobile cases, making an already challenging LRAC problem even more challenging. While many of the existing LRAC schemes developed for the fixed cases might in theory work well in the mobile cases, only a few have been actually tested at sea-going experiments. Examples include single-carrier communications with linear channel equalization reported in H. Song, S. Cho, T. Kang, W. Hodgkiss, and J. Preston, "Long-range acoustic communication in deep water using a towed array," The Journal of the Acoustical Society of America, vol. 129, no. 3, pp. EL71-EL75, 2011, and orthogonal frequency division multiplexing (OFDM) reported in T. Kang, H. Song, and W. Hodgkiss, "Long-range multi-carrier acoustic communication in deep water using a towed horizontal array," The Journal of the Acoustical Society of America, vol. 131, no. 6, pp. 4664-4671, 2012.

Disadvantages of these prior art approaches include the need of complicated receiver processing such as phase/Doppler tracking and correction, channel estimation and tracking, channel equalization, and frequent performance outage due to unpredictable environmental fluctuations. It is therefore desirable to provide a method that minimizes such disadvantages.

BRIEF SUMMARY OF THE INVENTION

According to the invention, a method for mobile underwater acoustic communications includes double differentially (DD) encoding a communication signal to produce a DD-encoded communication signal, applying direct sequence spread spectrum (SS) to the DD-encoded signal to produce a DD-SS communication output signal, and transmitting the DD-SS communication output signal.

By combining direct sequence SS with DD coding, the DD-SS method provides elegant solutions to many challenging problems faced by mobile LRAC. The invention is extremely simple as it does not require any complicated signal processing such as channel estimation, channel equalization, phase and Doppler tracking and correction.

The invention i) increases the SNR via processing gain, ii) eliminates the ISI through multipath suppression, and iii) enables bandwidth efficiency improvement via data multiplexing. And, the use of DD coding and decoding forgoes the need of explicit phase/Doppler tracking and correction at symbol detection. Together with traditional beamforming, DD-SS offers an effective means of dealing with those performance-limiting factors with simple receiver processing. More importantly, because neither channel estimation nor Doppler/phase tracking is involved, the performance of DD-SS is inherently robust against unpredictable fluctuations in underwater communication environments, making it particularly suitable for the mobile LRAC cases. Experimental data show that the DD-SS invention obtains an uncoded bit error rate (BER) of less than 4% at a data rate of 6.4 bits/s for a bandwidth of 200 Hz and at a range of 550 km.

The invention provides high performance reliability, since the receiver processing does not require knowledge of channels, and low computational complexity since no complicated channel estimation and equalization is needed. The invention provides high bandwidth efficiency since no overhead is required for channel estimation or for phase/Doppler tracking, and data multiplexing is available for better bandwidth efficiency.

DETAILED DESCRIPTION OF THE INVENTION

Figure 1:
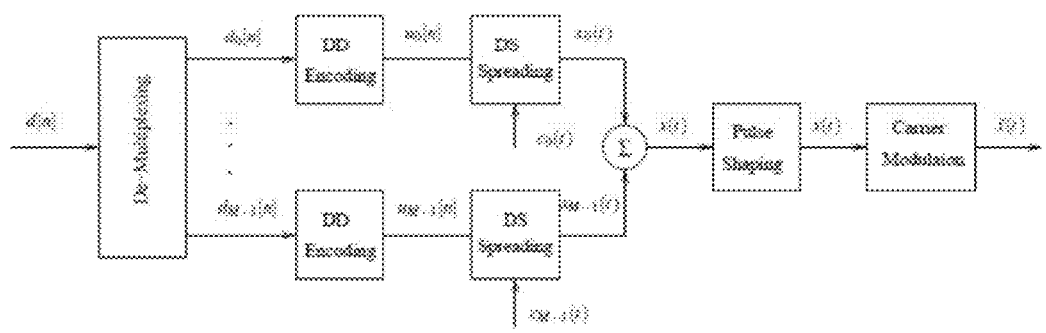
FIG. 1 is a schematic diagram of a DD-SS transmitter according to the invention.

The DD-SS Transmitter
Design of Transmitted Signal:

FIG. 1 illustrates a system diagram of a DD-SS transmitter in accordance with the invention. The transmitter is designed to generate a transmitted signal that not only suits for long-range propagation through underwater acoustic channels but also enables simple detection at the receiver (as will be discussed further below).

Assume that A1) all information symbols are phase-modulated with unit magnitude, i.e., $|d[n]|=1$ $\forall n$. At the transmitter, information symbols $d[n]$'s are first demultiplexed into M independent data sequences:

$$d_i[n] := d[nM+i], i=0,\ldots,M-1,$$

which are then forwarded to the corresponding branches of DD encoding and DS spreading.

At each (say, the ith) branch, data symbols $d_i[n]$ are first DD encoded into coded symbols $u_i[n]$ by using two recursions:

$$u_i[n]=u_i[n-1]v_i[n], n=0,1,\ldots$$

$$u_i[-1]=1 \quad (1)$$

and $$v_i[n]=v_i[n-1]d_i[n], n=0,1,\ldots$$

$$v_i[-1]=1. \quad (2)$$

These two recursions reveal that DD coding is nothing but a repetition of single differential (SD) coding. It is well known that SD coding makes possible to forgo phase tracking at symbol detection. By repeating SD coding, DD coding enables symbol detection without the need of tracking not only phase shifts but also Doppler shifts, as we will discuss later. Note that under assumption A1, there will be no divergence in signal power due to recursions. After DD coding, each coded symbol $u_i[n]$ is then DS spread by the spread waveform $$c_i(t) := \sum_{k=0}^{G-1} c_{i,k} \phi(t - kT_c) \quad (3)$$

to generate the spread spectrum signal $x_i(t)$, as:

$$x_i(t) = \sum_{n=0}^{\infty} u_i[n] c_i(t - nT_s)$$

where $T_s$ is the symbol interval. In (3), $c_i=[c_{i,1},\ldots,c_{i,G}]$ represents the spread code used for the generation of $c_i(t)$, $T_c=T_s/G$ is the chip interval, and $\phi(t)$ denotes the chip pulse function.

In DD-SS, DS spreading is employed to i) increase the SNR via processing gain, ii) eliminate the ISI through multipath suppression, and iii) enable bandwidth efficiency improvement via data multiplexing. To serve these purposes, it is desirable to design spreading codes such that the corresponding spreading waveforms are both orthogonal and shift-orthogonal, i.e., $$r_{ij}(\tau) := \int c_i(t) c_j(t-\tau) dt = \begin{cases} 1, & i=j \text{ and } \tau=0 \\ 0, & \text{otherwise} \end{cases} \quad (4)$$

After DS spreading, the summation of the M spread spectrum signals is pulse-shaped and then modulated onto carrier frequency $f_c$. The transmitted signal in passband is thus given by:

$$\tilde{x}(t) = Re\{x(t) e^{j2\pi f_c t}\} \quad (5)$$

Where $x(t) = \sum_{i=0}^{M-1} \sum_{n=0}^{\infty} u_i[n] c_i(t-nT_s)$ is the baseband equivalent of $\tilde{x}(t)$. Note that in writing $\tilde{x}(t)$, we have absorbed the effect of pulse shaping into $\phi(t)$.

The spectrum of $\tilde{x}(t)$ is determined by $\phi(t)$, $T_c$ and $f_c$. To make $\tilde{x}(t)$ suitable for propagation through a physical channel with a bandwidth range $[f_l, f_h]$, we choose $f_c=(f_l+f_h)/2$, $\phi(t)$ as a root raised cosine function with a roll-off factor $\beta$ and $T_c=(\beta+1)/(f_h-f_l)$. Under these choices, it is not difficult to find that the DS-SS supports a data rate:

$$R_b = \frac{M \log_2 |C|}{G} \times \frac{B}{1+\beta} \text{bits/sec.}, \quad (6)$$

where $B:=f_h-f_l$ denotes the signal bandwidth, and $|C|$ is the size of the signal constellation C to which information symbols belong. Clearly, one can control the data rate by selecting different values of signaling parameters M, $|C|$ and G.

Formulation of Received Signals:

The transmitted signal, after propagating through the underwater channel, is received by an array of $N_r$ equally spaced receiver elements. To model the $N_r$ received signals, the following two commonly-used channel assumptions are made:

A2) The channel between the source and the receiver array is a linear time-varying (LTV) multipath channel of $N_p$ resolvable paths, with impulse response given by $$h(t, \tau) = \sum_{p=1}^{N_p} A_p(t) \delta(\tau - \tau_p(t)) \quad (7)$$

where $A_p(t)$ and $\tau_p(t)$ denote the time-varying path amplitude and delay of the pth path, respectively.

A3) The $N_r$ received signals are plane-wave arrivals. Therefore, any two of them are related by a time offset.

Under these assumptions, the Nr received signals can be expressed as:

$$\tilde{r}_m(t) = \tilde{s}\left(t - m\frac{d}{c}\cos\theta_r\right) + \tilde{w}_m(t), \quad (8)$$

$$m = 0, \ldots, N_r - 1$$

where d is the spacing between two adjacent receiver elements, c is the speed of sound, and $\theta_r$ denotes the angle of arrival (AOA), $\tilde{w}_m(t)$ captures the additive noise, and $$\tilde{s}(t) = \sum_{p=1}^{N_p} A_p(t)\tilde{x}(t - \tau_p(t)) \qquad (9)$$

is the noise-free received signal at the first receiver element. It is noted that assumptions A2 and A3 have also been used in deriving the data model of M. Simon and D. Divsalar, "On the implementation and performance of single and double differential detection schemes," Communications, IEEE Transactions on, vol. 40, no. 2, pp. 278-291, February 1992. How accurate this model is will be tested by at-sea experiments. Next, we describe how to recover information symbols from $\tilde{r}_m(t)$.

The DD-SS Receiver

Figure 2:
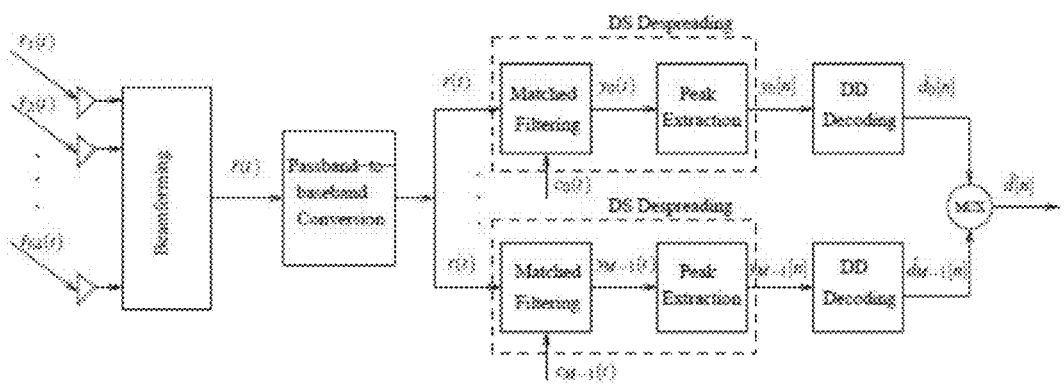
FIG. 2 is a schematic diagram of a DD-SS receiver according to the invention.

Long-range communications through underwater acoustic channels is challenging and is expected to suffer from a variety of severe signal distortions. Each of those distortions could make symbol detection highly unreliable or even impossible. For reliable symbol recovery, it is thus critical to remove them prior to symbol detection. In this section, we discuss how this can be done by using a receiver processing scheme plotted in FIG. 2. The proposed receiver processing consists of several steps, with each step targeting at a particular signal distortion. In what follows, we describe these steps in details, under the following assumptions:

A4) Among the $N_p$ channel paths in (7), one (say, the qth) path dominates the others in terms of having a much larger path amplitude.

A5) Both path amplitudes $A_p(t)$ and path delays $\tau_p(t)$ vary with time slowly such that they remain approximately constant within the symbol interval $T_s$.

Assumption A4 can be justified by recognizing the fact that there usually exists a direct path between the transmitter and the receiver array in LRAC in deep water. As compared to reflected paths, a direct path suffers from less attenuation and thus has a much large magnitude. This fact will be verified by analyzing experimental data.

Beamforming:

In LRAC, the received signals are expected to have extremely low SNRs due to large transmission losses and high noise levels from the towing receiver ship. Beamforming constitutes the first step taken to ensure adequate SNRs for symbol detection. Recalling that all signal parts in $\tilde{r}_m$*s are related by time shifts, beamforming amounts to forming the beamformed signal as:

$$\tilde{r}(t) = \sum_{m=0}^{N_r-1} \tilde{r}_m\left(t - m\frac{d}{c}\cos\hat{\theta}_r\right) \qquad (10)$$

where $\hat{\theta}_r$ stands for an estimate of the AOA $\theta_r$. By combining the signal parts coherently and the noise parts incoherently, this so-called delay-and-sum beamformer has a potential of increasing the SNR by 10 log Nr dB. In this work, the estimated AOA is obtained by searching for a $\hat{\theta}_r$ such that the beamformed signal $\tilde{r}(t)$ achieves its maximum possible power. To reduce computational complexity, such search is done in frequency domain by using fast Fourier transform (FFT).

DS Despreading:

Before information symbols can be detected, one needs to obtain decision statistics of coded symbols (say, u[m] for some l and m) from the baseband equivalent of $\tilde{r}(t)$ which, using (10), (8) and (9), can be written as:

$$r(t) = \sum_{p=1}^{N_p} A_p(t)e^{j\varphi_p(t)}c_l(t - mT_s - \tau_p(t))u_l[m] + \qquad (11)$$

$$\sum_{i \neq l}^{M-1} \sum_{p=1}^{N_p} \sum_{n \neq m}^{\infty} A_p(t)e^{j\varphi_p(t)}c_i(t - nT_s - \tau_p(t))u_i[n] + w(t)$$

where $\phi_p(t):=-2\pi f_c\tau_p(t)$ is introduced to capture the phase of the pth path, and w(t) represents the baseband noise. As evident in (11), r(t) consists of $N_p$ signal terms (in the first summation) caused by multipath propagation, a number of interference terms (in the second summation) due to data multiplexing, and a noise term. Among the $N_p$ signal terms, under assumption A4, the qth term is dominant and provides the most reliable decision statistics for $u_l$[m]. Considering this, we perform DS despreading to extract this term from r(t) by computing:

$$y_l[m] = \int r(t)c_l(t - mT_s - \tau_q(t))dt, \qquad (12)$$

where $y_l$[m] denotes the decision statistics of $u_l$[m]. In the ideal case where spreading waveforms satisfy (4), it can be shown that, under assumption A5, $$y_l[m] = A_q[m]e^{j\phi_q[m]}u_l[m] + w_l[m] \qquad (13)$$

where $A_q[m]=A_q(mT_s)$, $\phi_q[m]=\phi_q(mT_s)$ and $W_l$[m] denotes the noise. Regarding (12) and (13), two remarks are due:

Remark 1) In the case where spreading waveforms satisfy (4), DS spreading improves reliability of $y_l$[m] by i) reducing the noise power level by 10 log G dB via processing gain and ii) eliminating interfering terms caused by multipath propagation and data multiplexing completely. In practice, ideal spreading waveforms might not be available. However, it is not difficult to construct spreading waveforms with $r_{ij}(\tau) \approx 0$ for $i \neq j$ or $\tau \neq 0$. In this case, DS spreading is capable of suppressing those interfering terms effectively. As a result, $y_l$[m] is expected to enjoy a reasonably high SNR. In the remainder of this paper, we absorb into the noise term $w_l$[m] all residual interference caused by the use of non-ideal spreading waveforms.

Remark 2) The operation of DS despreading in (12) requires knowledge of $\tau_q(t)$. To avoid such requirement, (12) can be alternatively implemented by first matched filtering r(t) with a filter $c_l(-t)$, and then searching at the output for a peak within the interval $[mT_s,(m+1)T_s]$.

DD Decoding:

Given decision statistics $y_l$[m]'s, DD decoding is performed to recover information symbols $d_l$[m], under the following assumption:

A6) The path phase $\phi_q$[m] vary linearly within the interval of three consecutive information symbols, i.e., $\phi_q[m+1]-\phi_q[m]=\phi_q[m]-\phi_q[m-1]$.

Under this assumption, the Doppler shift of the dominant path is allowed to change slowly as long as it remains approximately constant within three consecutive symbol intervals. Recall that the dominant path in mobile LRAC is most likely the direct path. Under Assumption A6, the source ship and/or receiver ship are thus allowed to change its speed or direction without affecting symbol detection.

To perform DD decoding, we first form:

$$z_l[m] = \frac{(y_l[m]y_l^*[m-1])\cdot(y_l[m-1]y_l^*[m-2])^*}{|y_l[m]y_l^*[m-1]|\cdot|y_l[m-1]y_l^*[m-2]|}, \quad (14)$$

with superscript * standing for conjugation and ∥ denoting the magnitude of a complex number, and then make decision on $d_l[m]$ as:

$$\hat{d}_l[m]=\det(z_l[m]) \quad (15)$$

with det(•) representing a PSK detector. By combining (13), (1) and (2), it can be readily verified that $z_l[m]=d_l[m]$ when $w_l[m]=0$. In other words, the proposed receiver processing is capable of achieving perfect symbol recovery at least in the noise-free case. It is worth pointing out that this has been accomplished without any complicated receiver processing such as channel estimation and tracking, channel equalization and Doppler tracking and correction. This, on the one hand, reduces receiver complexity considerably, and on the other hand, makes the performance robust against unpredictable changes in communication environments.

The design of the DD-SS receiver has been based on a number of channel assumptions that may or may not hold valid in practice. To test the performance of DD-SS, we participated LRAC10 and collected the received data. In the next section, we report the performance results we have obtained by analyzing experimental data.

LRAC 10: Experimental Demonstration

Figure 3:
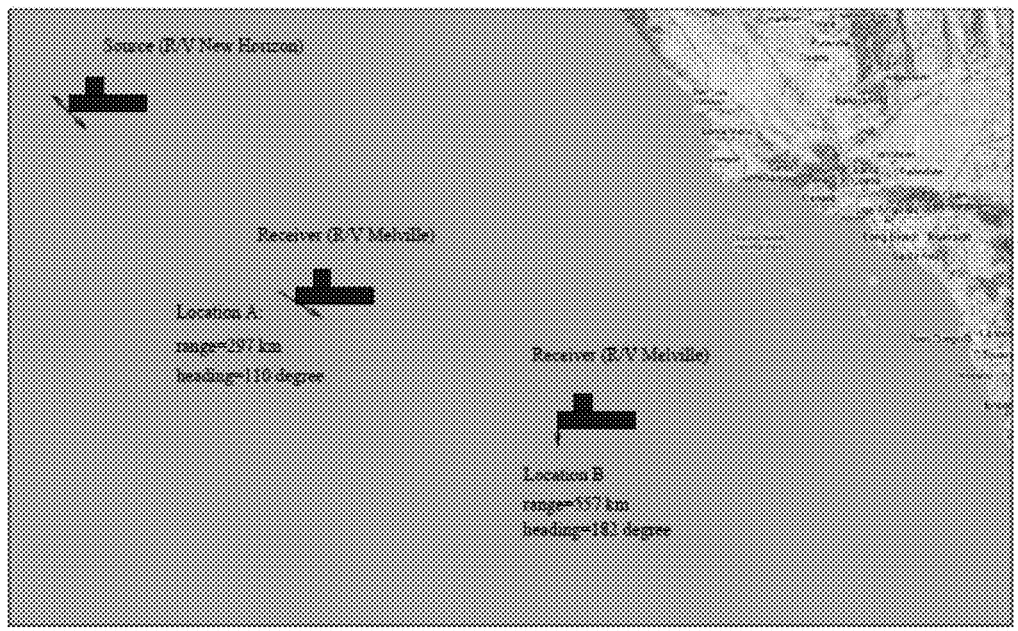
FIG. 3 is a schematic representation of an LRAC10 experiment conducted in deep water off the Southern California Coast according to the invention.

Experiment Setting:

As illustrated in FIG. 3, the LRAC10 experiment was conducted in deep water off the Southern California Coast in September 2010. Two research ships from Scripps Institution of Oceanography were involved. The source ship (R/V New Horizon) towed a J-15 source at a speed of 2-3 knots around the region centered at location (34° N, 129° W). The source was deployed at a depth of about 75 m with a source level of approximately 172 dB μPa@1 m. The receiving ship (R/V Melville) towed a HLA (Five Octave Research Array or FORA) mostly at a speed of 3.5 knots at a depth of about 200 m. The 189-m long ultra-low frequency (ULF) sub-aperture of the FORA was used for reception. The sub-aperture consisted of $N_r=64$ receiver elements equally spaced at d=3 m.

To test DD-SS, two DD-SS signals were transmitted using a bandwidth of B=200 Hz ranging between $f_l=100$ Hz and $f_h=300$ Hz. The two DD-SS signals were generated by using the scheme described in Section II with different signaling parameters. The first signal (referred to as BPSK signal) employed BPSK modulation (i.e., C={1,−1}) and no data multiplexing (i.e., M=1), and carries information of 439 bits. The BPSK signal was used as a baseline signal to test feasibility of the DD-SS system. The second signal (referred to as 4-PSK signal) employed 4-PSK modulation (i.e., C={1,1 j,−1,−1 j}) and data multiplexing of order M=2, and it carries information of 474 symbols or 1896 bits. The use of the 4-PSK signal was intended to investigate how performance and data rate are traded off in DD-SS. To generate spreading waveforms in both signals, we choose Kasami codes of length G=63 (see L. Welch, "Lower bounds on the maximum cross correlation of signals (corresp.)," Information Theory, IEEE Transactions on, vol. 20, no. 3, pp. 397-399, May 1974) as spreading codes, and a root raised cosine function with a roll-off factor β=1 as the pulse shaping function. As per (6), the data rates corresponding to the two signals are 1.6 bits/sec and 6.4 bits/sec, respectively.

In our test, we were only interested in uncoded error performance. No error correcting codes was used in either signal. To facilitate signal discovery at the receiver array, a linear frequency modulated (LFM) signal was sent before the DD-SS signal. The two signals were separated by a guard time of 3 seconds to avoid interference.

In LRAC10, the two DD-SS signals were transmitted at different hours and consequently, they were received at different locations: the BPSK signal at location A (33.38° N, 126.32° W) and the 4-PSK signal at location B (32.28° N, 124.06° W). At the two locations, the corresponding source-receiver ranges are 297 km and 557 km, and the headings of the receiver ship are 110° and 182° from the North, respectively, as indicated in FIG. 3.

Experimental Results:

As the first step in beamforming, we acquire an estimate of the AOA by searching for an AOA that maximizes the power of the corresponding beamformed signal. The estimated AOA (measured from the forward endfire direction) turns out to be 167° for the BPSK case and 112° for the 4-PSK case. Both estimated AOAs are consistent with the theoretical ones that have been computed based on the location and heading data of the source and the receiver array.

Figure 4A:
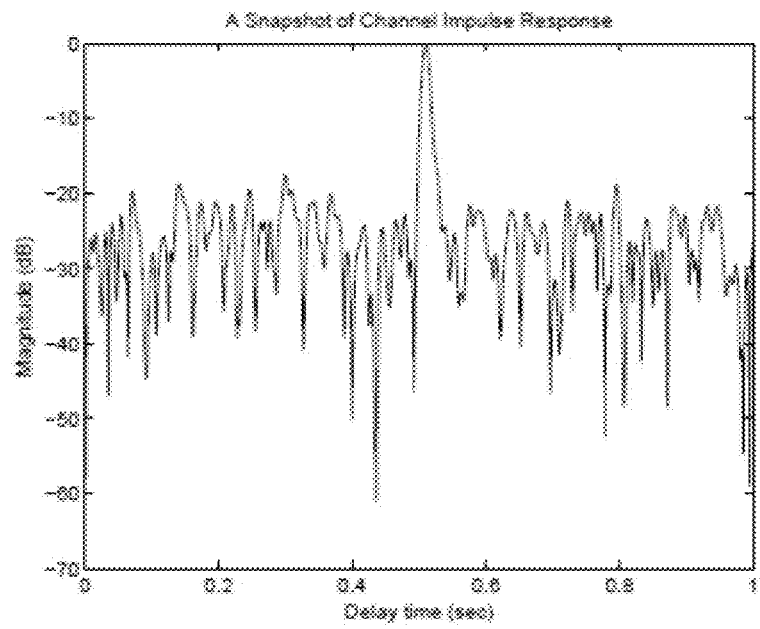
FIGS. 4A-B are graphs showing snapshots of channel impulse responses according to the invention.
Figure 4B:
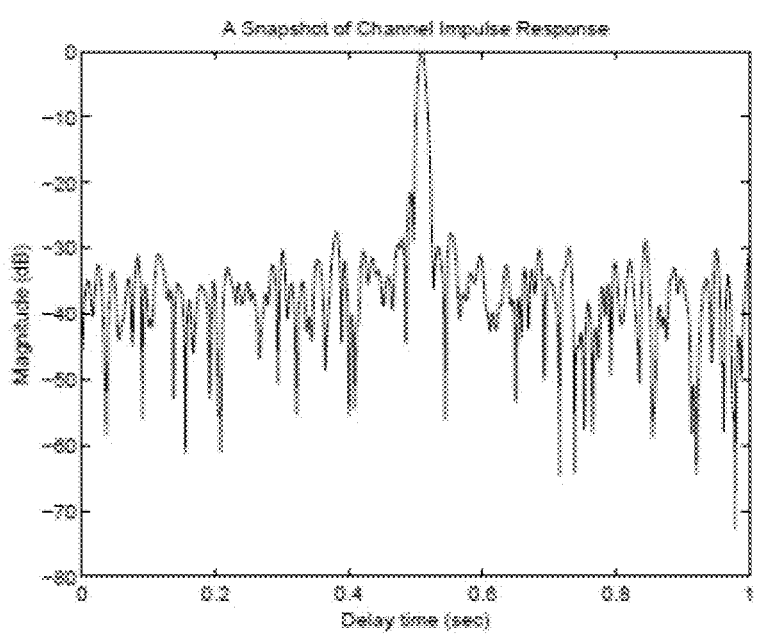

Because such computation assumes a direct path between the source and the receiver array, it thus can be implied that a dominant direct path exists between the source and the receiver array, as stated in assumption A4. This implication is further confirmed by FIGS. 4(a) and 4(b) where two snapshots of the channel impulse response are plotted for the two signal cases. The two snapshots are obtained by correlating the beamformed received signal with the corresponding transmitted LFM signal.

Figure 5:
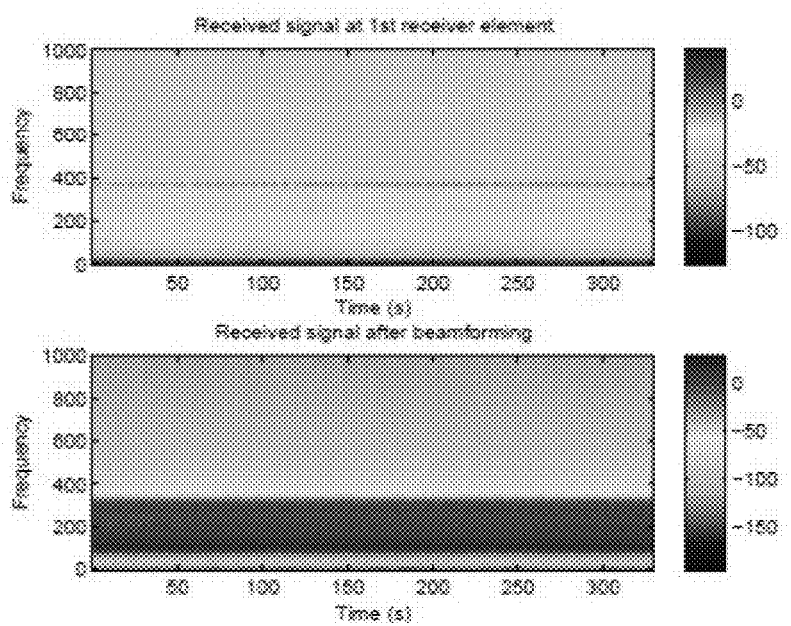
FIG. 5 shows the spectrogram of the signal received at the first array element (top figure) and the spectrogram of the received signal after beamforming (bottom figure) according to the invention.

To see how beamforming improves the input SNR, we compare the spectrogram of the received signal at the first array element (i.e., $\tilde{r}_1(t)$) with that of the beamformed signal r(t) in the BPSK case. As shown in FIG. 5, the BPSK signal is hardly visible before beamforming. By computing the powers of the received signal within the intervals of the LFM signal and the guard time, the SNRs of $\tilde{r}_1(t)$ and r(t) are estimated to be −20 dB and −5 dB, respectively. In other words, beamforming helps improve the input SNR by 15 dB, which is only 3 dB less than the theoretical value 10 log 64=18 dB. Such difference is likely due to the noise correlation. It is important to point out that after beamforming, the input SNR at −5 dB is still not high enough for reliable symbol recovery. To some extent, this justifies the need of DS spread/despreading in DD-SS.

Figure 6:
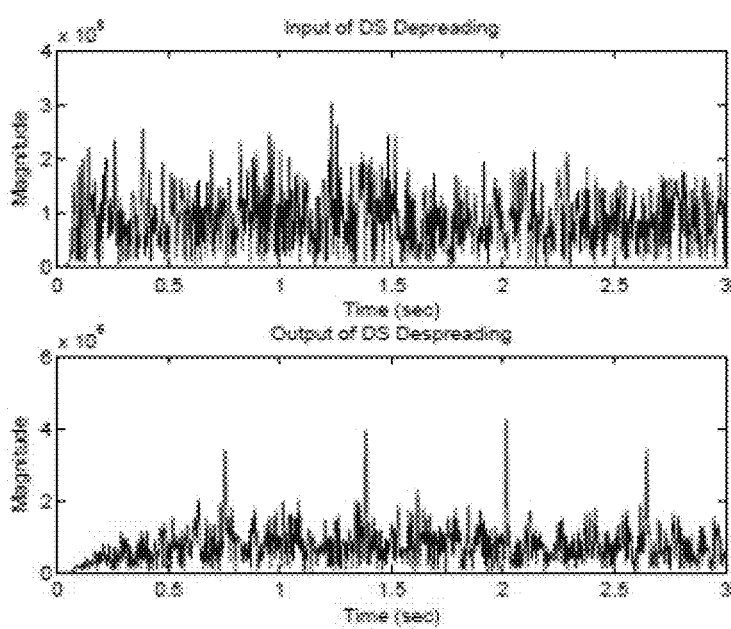
FIG. 6 are graphs of the input to DS despreading (top figure) and the output after DS despreading (bottom figure) according to the invention.

The importance of DS spreading and despreading can be better appreciated by comparing the input and output signals of DS despreading. FIG. 6 plots two 3-second long signals, the top one is a part of the input signal of DS despreading in the BPSK case, and the bottom one is the corresponding output signal. Clearly, DS despreading helps suppress interference and noise, and therefore improves reliability of symbol recovery.

Figure 7:
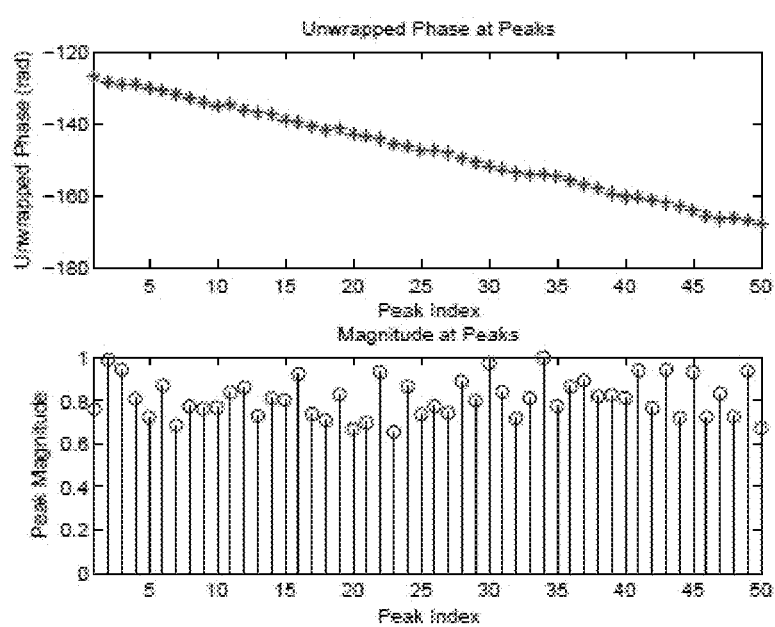
FIG. 7 are graphs of the magnitude and unwrapped phase of the peaks at the output of DS despreading according to the invention.

The operation of DD decoding is based on the phase of the signal peaks after DS despreading. As evident in FIG. 7, the magnitude of the signal peaks tends to change quite randomly. Since DD decoding does not rely on the magnitude information, randomness in the magnitude will thus have no effect on its performance. On the other hand, although the phase variation is not linear overall, as shown in FIG. 7, it is quite linear within the duration of three consecutive peaks, as we assumed in assumption A6. Therefore, DD decoding is expected to yield good performance.

Figure 8A:
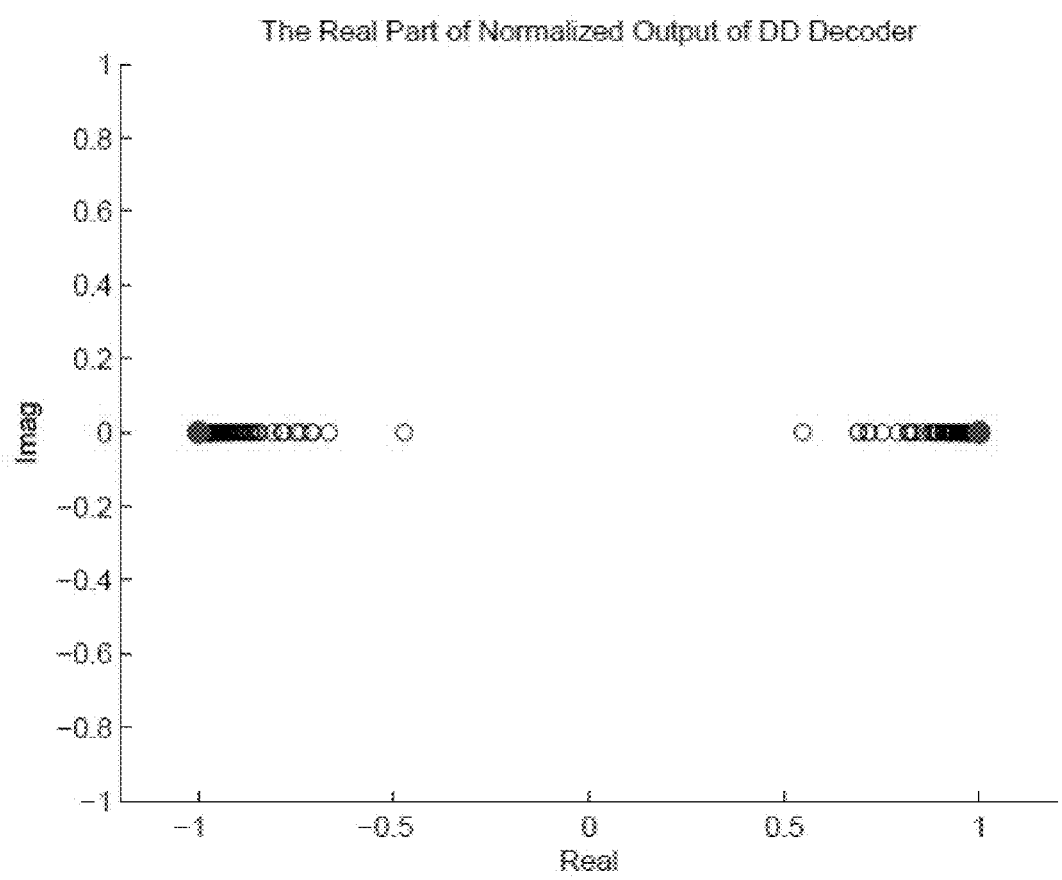
FIGS. 8A-B are scatter plots of the normalized output of the DD decoder for the BPSK case and the 4-PSK case, respectively, according to the invention.
Figure 8B:
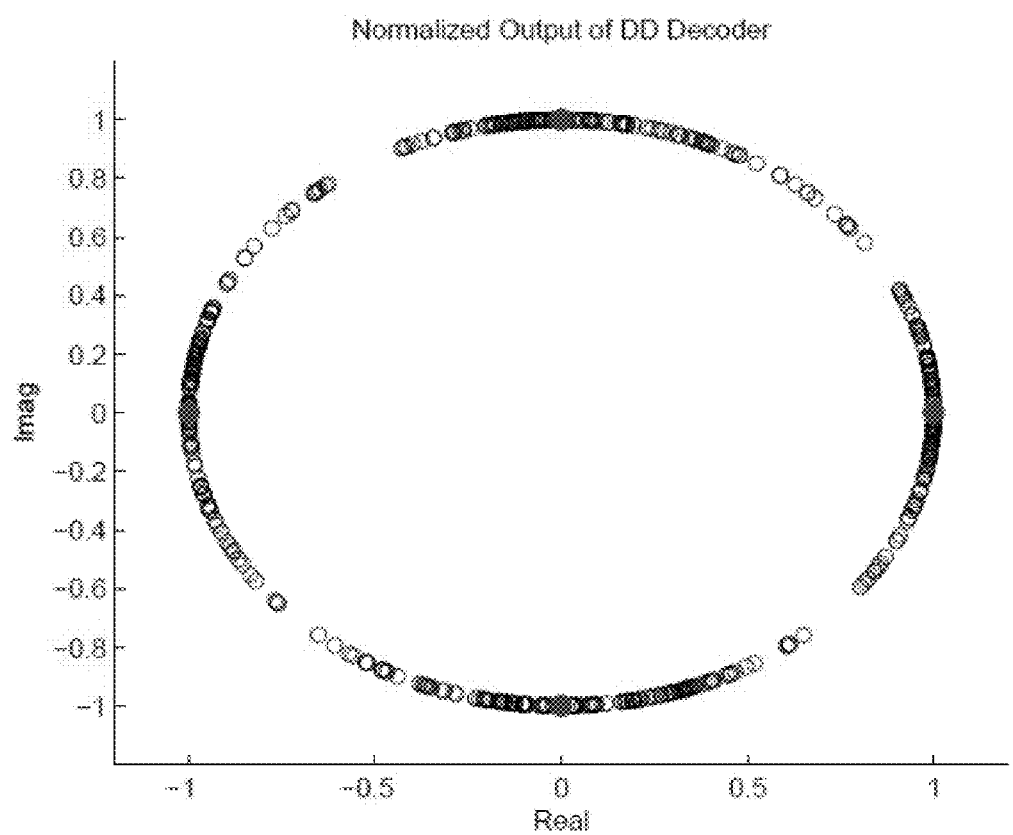

FIGS. 8(a) and 8(b) plot the normalized output (i.e., $z_l[m]$ in (14)) of the DD decoder for the two signal cases. The corresponding BER is 0% for the BPSK case and 4% for the 4-PSK case. For the 4-PSK case, error-free communications can be easily achieved by incorporating error-correcting channel coding with a slight reduction of data rate. In a word, our experimental data shows that DD-SS is at least capable of achieving excellent uncoded error performance (less than 4%) at a data rate of 6.4 bits/s for a bandwidth of 200 Hz and at a range of 550 km.

The invention therefore provides a novel LRAC scheme that is specially designed for the mobile cases. Its approach is different than prior art LRAC schemes. Instead of relying on complicated receiver processing to compensate various distortions to the communication signal, the invention utilizes the communication signal itself to make it easier to compensate those distortions at the receiver. The invention utilizes both direct sequence (DS) spread spectrum (SS) and double differential (DD) coding, and is termed direct sequence spread spectrum (DD-SS).

Obviously many modifications and variations of the present invention are possible in the light of the above teachings. It is therefore to be understood that the scope of the invention should be determined by referring to the following appended claims.

What is claimed as new and desired to be protected by Letters Patent of the United States is:

1. A method for mobile underwater acoustic communications, comprising:
    double differentially (DD) encoding a transmitter-generated communication signal to produce a transmitter-generated DD-encoded communication signal;
    applying transmitter-generated direct sequence spread spectrum (SS) to the transmitter-generated DD-encoded signal to produce a transmitter-generated DD-SS communication output signal; and
    transmitting the transmitter-generated DD-SS communication output signal, and wherein the DD encoding is implemented by transmitter-generated demultiplexing phase-modulated information symbols d[n]'s into M independent data sequences $d_i[n]:=d[nM+i]$, i=0, ..., M−1 and then transmitter-generated generating DD coded symbols $u_i[n]$ via two recursions:

$$u_i[n]=u_i[n-1]v_i[n], n=0,1,\ldots$$

$$u_i[-1]=1 \tag{1}$$

and $$v_i[n]=v_i[n-1]d_i[n], n=0,1,\ldots$$

$$v_i[-1]=1, \tag{2}$$

and the transmitter-generated direct sequence spread spectrum (SS) is implemented by a transmitter-generated DS spreading comprising spreading DD coded symbols $u_i[n]$ with the spreading waveform $$c_i(t) := \sum_{k=0}^{G-1} c_{i,k} \phi(t - kT_c) \tag{3}$$

to generate a transmitter-generated spread spectrum signal $x_i(t)$, as:

$$x_i(t) = \sum_{n=0}^{\infty} u_i[n] c_i(t - nT_s)$$

where $T_s$ is a symbol interval and in (3) $c_i=[c_{i,1},\ldots,c_{i,G}]$ represents a spread code used for the generation of $c_i(t)$, $T_c=T_s/G$ which is a chip interval, and where $\phi(t)$ denotes a chip pulse function.

2. The method of claim 1, wherein after DS spreading, a transmitter-generated summation of the M spread spectrum signals is pulse-shaped and then modulated onto a carrier frequency $f_c$ to generate the transmitted DD-SS communication signal as $\tilde{x}(t)=\text{Re}\{x(t)e^{j2\pi f_c t}\}$ with $x(t)=\sum_{i=0}^{M-1}\sum_{n=0}^{\infty} u_i[n]c_i(t-nT_s)$ being the baseband equivalent of $\tilde{x}(t)$.

3. A method for mobile underwater acoustic communications, comprising:
    double differentially (DD) encoding a transmitter-generated pre-transmission communication signal comprising a plurality of symbols to produce a transmitter-generated DD-encoded communication signal;
    applying transmitter-generated direct sequence spread spectrum (SS) to the transmitter-generated DD-encoded signal to produce a transmitter-generated DD-SS communication output signal;
    transmitting the transmitter-generated DD-SS communication output signal through an underwater communications channel;
    receiving the transmitter-generated DD-SS communication output signal at an array of $N_r$ equally spaced receiver elements to receiver-processed form $N_r$ received DD-SS signals;
    receiver-processed beamforming the $N_r$ received DD-SS signals;
    receiver-processed despreading (DS) the $N_r$ received DD-SS signals to produce a receiver-processed DS output; and
    receiver-processed double differentially (DD) decoding the DS output to produce a receiver-processed recovered communication signal comprising a plurality of symbols substantially conforming to the plurality of symbols of the pre-transmission communication signal, and wherein the transmitter-generated DD encoding is implemented by transmitter-generated demultiplexing phase-modulated information symbols d[n]'s into M independent data sequences $d_i[n]:=d[nM+i]$, i=0, ..., M−1 and then transmitter-generated generating DD coded symbols $u_i[n]$ via two recursions:

$$u_i[n]=u_i[n-1]v_i[n], n=0,1,\ldots$$

$$u_i[-1]=1 \tag{1}$$

and $$v_i[n]=v_i[n-1]d_i[n], n=0,1,\ldots$$

$$v_i[-1]=1. \tag{2}$$

and the direct sequence spread spectrum (SS) is implemented as a DS spreading comprising spreading DD coded symbols $u_i[n]$ with the spreading waveform $$c_i(t) := \sum_{k=0}^{G-1} c_{i,k} \phi(t - kT_c) \tag{3}$$

to generate a spread spectrum signal $x_i(t)$, as:

$$x_i(t) = \sum_{n=0}^{\infty} u_i[n]c_i(t-nT_s)$$

where $T_s$ is a symbol interval and in (3) $c_i=[c_{i,1},\ldots,c_{i,G}]$ represents a spread code used for the generation of $c_i(t)$, $T_c=T_s/G$ which is a chip interval, and where $\phi(t)$ denotes a chip pulse function.

4. The method of claim 3, wherein after DS spreading, a transmitter-generated summation of the M spread spectrum signals is pulse-shaped and then modulated onto a carrier frequency $f_c$ to generate the transmitted DD-SS communication signal as $\tilde{x}(t)=\text{Re}\{x(t)e^{j2\pi f_c t}\}$ with $x(t)=\sum_{i=0}^{M-1}\sum_{n=0}^{\infty} u_i[n]c_i(t-nT_s)$ being the baseband equivalent of $\tilde{x}(t)$.

5. The method of claim 4, wherein the DS despreading is implemented by computing:

$$y_l[m]=\int r(t)c_l(t-mT_s-\tau_q(t))dt, \tag{12}$$

where $y_l[m]$ denotes a decision statistics of $u_l[m]$.

6. The method of claim 5, wherein the DD decoding is implemented by first forming:

$$z_l[m] = \frac{(y_l[m]y_l^*[m-1])\cdot(y_l[m-1]y_l^*[m-2])^*}{|y_l[m]y_l^*[m-1]|\cdot|y_l[m-1]y_l^*[m-2]|},$$

with superscript * standing for conjugation and $\|$ denoting the magnitude of a complex number, and then making a decision on $d_l[m]$ as: $\hat{d}[m]=\det(z_l[m])$ with $\det(\bullet)$ representing a PSK detector.

* * * * *